United States Patent Office 3,514,137
Patented May 26, 1970

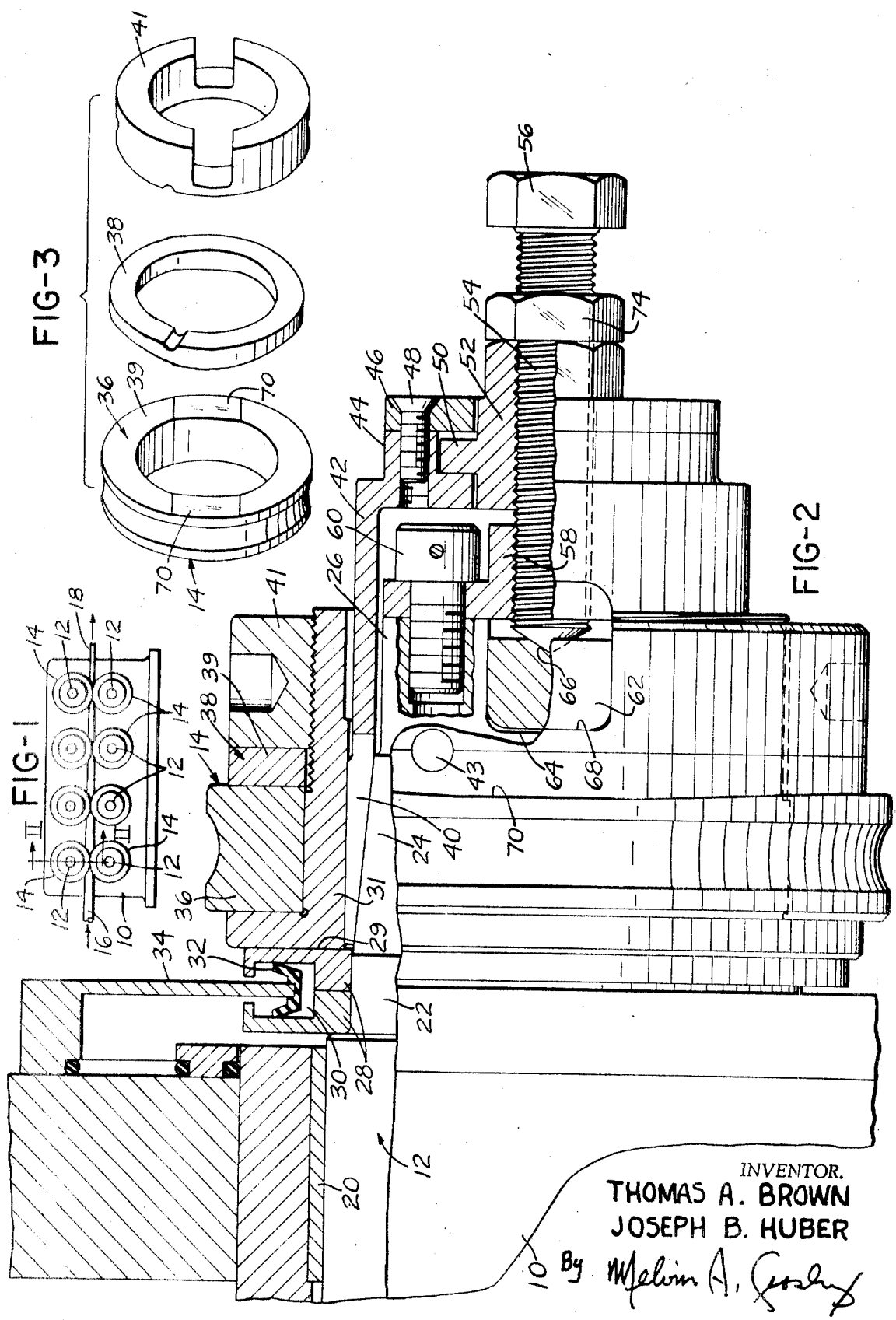

3,514,137
ROLL FOR ROD MILL AND MOUNTING
ARRANGEMENT THEREFOR
Thomas A. Brown, Greensburg, and Joseph B. Huber,
Acme, Pa., assignors to Kennametal Inc., Latrobe, Pa.,
a corporation of Pennsylvania
Filed Oct. 18, 1968, Ser. No. 768,871
Int. Cl. B60b 27/06
U.S. Cl. 287—53                          9 Claims

ABSTRACT OF THE DISCLOSURE

A form roll of hard material, such as cemented tungsten carbide, for example, is mounted on a sleeve carried by a driving shaft. A driving ring abuts one side of the roll and is keyed thereto by interfitting portions on the ring and roll. A nut on the sleeve clamps the ring against the roll and the roll against a flange on the end of the sleeve. A bar-like key engages notches in the shaft in the nut and keys the nut and roll to the shaft and is engaged by a screw which clamps the sleeve against a shoulder on the shaft. A split sleeve is forced between a cylindrical central bore in the sleeve supporting the roll and a tapered portion on the shaft which the roll and its sleeve surround.

---

The present invention relates to the connection of forming rolls to drive shafts for the rolls and is particularly concerned with the application of the invention to rod mills and the like.

Rod mills and tube mills are well known and consist of a frame having a plurality of pairs of driven rolls through which the material being treated is passed for forming. The forming of the material is accomplished by forming rolls having contoured grooves therein which progressively shape the member passing therethrough to the desired cross sectional configuration and size. A typical rod mill, for example, might take a round rod of a certain size and reduce it by progressive stages to a round rod of a smaller size. Other cross sectional shapes are also possible.

The work load on such forming rolls is extremely heavy and in order to insure an accurate end result and to eliminate slippage and breakage of the rolls and deflection thereof, it is extremely important that the roll be firmly connected to its driving shaft. The extremely heavy service to which the rolls are subjected requires that they be made of a hard material, such as cemented tungsten carbide. Heretofore, it has been difficult and expensive to attach rolls of tungsten carbide to the supporting shafts therefor and the present invention is particularly directed to an improved mounting arrangement for rolls of this type.

Accordingly, the primary objective of the present invention is the provision of an improved mounting arrangement for connecting forming rolls to the drive shafts in a rod mill or the like.

Another objective of this invention is the provision of a cemented tungsten carbide forming roll for a rod mill and a novel mounting arrangement therefor for fixedly connecting the roll to its supporting and driving shaft.

Other objectives and advantages of the present invention will become more apparent upon reference to the following detailed specification taken in connection with the accompanying drawings in which:

FIG. 1 is a schematic representation of a rod mill;

FIG. 2 is a fragmentary sectional view indicated by line II—II on FIG. 1 and showing more in detail the connection of a typical forming roll to its supporting and driving shaft; and FIG. 3 is a perspective view showing the forming roll together with the ring and nut which drivingly connect the roll to its shaft.

In the present invention large, heavy shafts are provided firmly mounted in a supporting frame and arranged in pairs so that rolls mounted on the shafts will be presented to each other to receive a work member such as a rod therebetween.

The rolls are mounted on an arbor which is disposed about a tapered region on the support shaft and a split tapered sleeve is pressed into the space between the inside of the arbor and the tapered region on the shaft. The arbor is notched at one end and receives a bar extending through a hole or notch in the shaft whereby the arbor and shaft are drivingly interconnected. The arbor has a flange at one end which the roll abuts and at the other end a nut is threaded on the arbor and clamps the roll against the flange on the arbor. Disposed between the nut and the roll is a drive ring and the ring and roll have interfitting portions. A shear pin drivingly connects the nut to the drive ring and the nut is, furthermore, notched to receive the bar that extends through the shaft as mentioned above. In the aforesaid manner the rolls are firmly held on the shaft against slipping thereon and are also confined against deflection in any direction thereby minimizing breakage of the rolls.

Referring now to the drawings somewhat more in detail, in FIG. 1 the frame of the rod mill is indicated at 10 and rotatably mounted therein are shafts 12 arranged in opposed pairs and each carrying a forming roll 14. A rod 16 of a larger size passes rightwardly through the rod mill and emerges therefrom at the right and as a rod 18 of smaller size and predetermined cross sectional configuration.

Turning now to FIG. 2 it will be seen that each shaft 12 is journaled in frame 10 as by a bearing 20 and, at the outside of the frame has a first reduced diameter portion 22, a tapered portion 24, and a second reduced diameter portion 26.

The first reduced diameter portion 22 receives a pair of rings 28 which have substantial annular cross sections thereof in abutting relation and which rings together confine a cavity 30 in which is a seal member 32, carried on a member 34 which is sealingly attached to frame 10 of the rod mill.

The inner ring 28 abuts a shoulder on shaft 12 and abutting the outer ring 28 is a flange 29 on the end of an arbor 31 on which is mounted a forming roll 36 according to the present invention. Abutting the outer side of roll 36 is drive ring means 38 which consists of a ring 39 and a nut 41.

The arbor 31 surrounds the tapered portion 24 of shaft 12 and positioned between the cylindrical central bore of arbor 31 and the tapered portion 24 of shaft 12 is a split tapered end region 40 of a sleeve member 42 which extends outwardly a substantial distance beyond ring 38. At its outer end sleeve 42 has an inwardly directed flange 44 and a retainer ring 46 is connected to the end of sleeve 42 by screws 48 to define an annular cavity for receiving the radial flange 50 of a nut 52. Nut 52 is threaded on a large bolt 54 having an exposed head 56 and, at its inner end, is threaded through a disc member 58 connected to the end of shaft 12 by cap screws 60.

The second reduced diameter end portion 26 of shaft 12 has a transverse slot therein and closely receives a transversely extending bar-like key 62. Key 62 is confined within the slot 64 provided therefor in the end of shaft 12 by disc 58 and, furthermore, has a conical recess 66 engaged by the conical end of screw 54. Key 62 extends through apertures provided therefor in sleeve 42 and engages notches 68 in the outer side of nut 41.

In this manner nut 41 is keyed to shaft 12 so as to rotate therewith.

Roll 36 on its side facing ring 39 is provided with wide angle V-shaped indentations 70 which receive the wide angle V-shaped projections formed on the adjacent side of ring 39. Ring 39 is locked to nut 41 by a radial shear pin 43 forced into a hole drilled therefor after nut 41 has been tightened. The roll 36, is thus, in turn, drivingly connected to shaft 12 to rotate therewith while being firmly supported thereon.

The roll 36 is clamped tightly against rings 28 by turning screw 54 so that key 62 is forced against nut 41 which, in turn forces roll 36 and arbor 31 tightly against rings 28. Thereafter, nut 52 is rotated to press sleeve 42 inwardly and thus will press the tapered region 40 of the sleeve firmly into the space between the inside of arbor 31 and the tapered portion 24 of shaft 12.

After the foregoing adjustments have been made, lock nut 74 on screw 54 can be tightened up against nut 52.

It will be evident that it is of advantage to drill a hole for shear pin 43 after nut 41 has been tightened up and it may also be of advantage to cut the notches for receiving bar 62 after the roll 36 has been mounted on the arbor and clamped thereon.

From the foregoing, it will be seen that the forming roll is extremely solidly supported on its drive shaft and fixed thereon against rotation so that high work loads can be opposed on the roll without the chance of it slipping on its supporting shaft or becoming loose on the supporting shaft. The roll, furthermore, is also supported so that it has little tendency to break and thus can deliver the maximum useful life.

Modifications can be made in the present invention falling within the scope of the appended claims.

What is claimed is:

1. A forming roll and a supporting arrangement therefor, especially for use in a mill, such as a rod mill; having a frame and a shaft rotatably supported in the frame and having one end projecting from the frame and comprising outwardly facing shoulder means and tapered portion; said arrangement comprising a forming roll having a cylindrical bore therein, a sleeve like arbor fitted into said bore and having a cylindrical central bore larger in diameter than the diameter of said tapered portion of said shaft, said arbor having a flange at its inner end abutting said shoulder means on one side and on the other side abutting one side of said roll, a drive ring on said arbor abutting the other side of the roll, a nut threaded on the outer end of said arbor and clamping said drive ring against said roll and said roll against said flange, the interengaging faces of said drive ring and roll having interfitting regions for the transmission of torque from the ring to the roll, means keying the nut to the ring, a sleeve element having a tapered region fitting between the bore in said arbor and the tapered portion of said shaft, means connecting the sleeve with the shaft operable for forcing the sleeve axially inwardly on the shaft to drive the tapered region of the sleeve into the space between the shaft and the arbor, a bar-like key extending transversely of said shaft and engaging notches provided therefor in said shaft and in said arbor and nut, and means connected to the shaft engaging said key and operable for forcing said key axially inwardly of said shaft thereby to force the flange of said arbor against the said shoulder means of said shaft.

2. An arrangement according to claim 1 in which said interfitting regions comprising wide angle substantially V-shaped projections and recesses on the interengaging faces of said drive ring and roll.

3. An arrangement according to claim 2 in which the recesses are formed in the roll and the projections are formed on the drive ring.

4. An arrangement according to claim 3 in which the said projections and recesses have planar faces disposed in planes extending at angles of about 2° from a perpendicular to the axis of said drive ring and roll.

5. An arrangement according to claim 1 in which said means keying the nut to the ring is in the form of a radial hole partly disposed in the ring and partly disposed in the nut, and a pin seated in said hole.

6. An arrangement according to claim 1 in which the said tapered region of said sleeve element is split in the axial direction.

7. An arrangement according to claim 6 in which the means connecting the sleeve with the shaft is in the form of an axial bolt screw threadedly connected with the shaft and a nut threaded on the bolt and connected with the sleeve.

8. An arrangement according to claim 7 in which said means for forcing said key axially inwardly of said shaft is the same said bolt.

9. An arrangement according to claim 1 in which said forming roll is made of cemented tungsten carbide.

References Cited
UNITED STATES PATENTS

| | | | |
|---|---|---|---|
| 1,166,408 | 12/1915 | Blood | 287—53 |
| 2,493,402 | 1/1950 | Hahn | 287—53 |
| 2,634,144 | 4/1953 | Friedman | 287—53 |
| 2,899,222 | 8/1959 | Ross | 287—53 |

DAVID J. WILLIAMOWSKY, Primary Examiner

A. V. KUNDRAT, Assistant Examiner

U.S. Cl. X.R.

241—293